United States Patent Office 3,350,337
Patented Oct. 31, 1967

3,350,337
FINISH FOR GLASS CLOTH
James K. Campbell, Midland, Mich., assignor to Dow Corning Corporation, Midland, Mich., a corporation of Michigan
No Drawing. Filed Mar. 14, 1962, Ser. No. 179,780
7 Claims. (Cl. 260—29.6)

This invention relates to a polyethylene-silicone finish for glass cloth.

When glass cloth is used for decorative purposes, such as drapes, it is necessary to apply a finish to the cloth in order to increase the abrasion resistance of the fibers. Otherwise excessive abrasion occurs during laundering and handling. In the case of fiber glass drapes, excessive abrasion can result from the movement of the drapes in a breeze. Although various finishes have been used to reduce the abrasion resistance, these finishes have other undesirable properties. Some of the present finishes do not impart sufficient water repellency to the fabric. Some of the present finishes also impart an objectional color to the fabric. Many of the present finishes do not appreciably increase the abrasion resistance of the glass fibers.

It is a primary object of this invention to develop a clear finish for glass cloth which increases the abrasion resistance of the fibers. It is a further object that the finish have a high degree of wash-fastness in order to prevent loss of the finish and pigment during laundering.

These objects are obtained by an article of manufacture comprising a woven glass cloth, the fibers in said cloth being coated with from 0.1 to 2.4 percent by weight based upon the weight of the glass cloth of a composition consisting essentially of
(1) 100 parts by weight of polyethylene and
(2) from 25 to 400 parts by weight of
   (A) from 3 to 100 mol per cent of a siloxane of the unit formula $R_aH_bSiO_{4-a-b/2}$, wherein R is an alkyl radical of from 1 to 5 inclusive carbon atoms, $a$ has a value of from 1.0 to 1.5 inclusive, $b$ has a value of from 0.75 to 1.25 inclusive and the sum of $a$ and $b$ is from 2.0 to 2.25 inclusive,
   (B) from 0 to 97 mol percent of the unit formula $R'_nSiO_{4-n/2}$, wherein R' is selected from the group consisting of monovalent hydrocarbon radicals of from 1 to 18 inclusive carbon atoms, dichlorophenyl and perfluoroalkylethyl radicals of the general formula

wherein $y$ has a value of from 1 to 10 inclusive, and $n$ has a value of from 1.75 to 2.2 inclusive.

This coating composition contains 100 parts by weight of polyethylene. This composition also contains from 25 to 400 parts by weight of a silicone material. From 3 to 100 mol percent of this silicone material is a siloxane of the unit formula $R_aH_bSiO_{4-a-b/2}$, where $a$ has a value of from 1.0 to 1.5 inclusive, $b$ has a value of from 0.75 to 1.25 inclusive and the sum of $a$ and $b$ is from 2.0 to 2.25 inclusive. R is an alkyl radical of from 1 to 5 inclusive carbon atoms. Illustrative of suitable siloxanes are methylhydrogensiloxane, ethylhydrogensiloxane and amylhydrogensiloxane. Although the silicone material can consist entirely of an organohydrogensiloxane, it is preferable that the organohydrogensiloxane be present in an amount from 10 to 90 mol percent. The preferred organohydrogensiloxane is methylhydrogensiloxane. This organohydrogensiloxane can be a homopolymer, a mixture of homopolymers or a copolymer.

The silicone material also contains (B) from 0 to 97 mol percent of a siloxane of the unit formula $R'_nSiO_{4-n/2}$. R' can be a monovalent hydrocarbon radical of from 1 to 18 inclusive carbon atoms. Specific examples of suitable hydrocarbon radicals are alkyl radicals, such as methyl, ethyl, tert-butyl and octadecyl; alkenyl radicals such as vinyl, allyl and butadienyl; cycloalkyl radicals such as cyclobutyl, cyclopentyl and cyclohexyl; cycloalkenyl radicals such as cyclopentenyl and cyclohexenyl; aryl radicals such as phenyl and xenyl; aralkyl radicals such as benzyl and xylyl and alkaryl radicals such as tolyl. R' can also be a dichlorophenyl radical. R' can also be a perfluoroalkylethyl radical of the general formula

with $y$ having a value of from 1 to 10 inclusive. Illustrative of the perfluoroalkylethyl radicals which are operative in this invention are 3,3,3-trifluoropropyl,

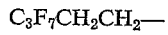

and $C_8F_{17}CH_2CH_2$—. The organosiloxane (B) can be a homopolymer (i.e. containing only one specie of siloxane unit) or a copolymer containing two or more species of siloxane units. The siloxane can also be a mixture of any combination of homopolymers and/or copolymers. In the siloxane, either one or different types of organic radicals can be attached to each silicon atom. This siloxane (B) can have from 1.75 to 2.2 inclusive of the above organic radicals per silicon atom. It is preferred, however, that this siloxane have from 1.9 to 2.1 organic radicals per silicon atom. It is preferred that R' be an alkyl radical of from 1 to 6 inclusive carbon atoms. The preferred alkyl radical is methyl. Although good results are obtained when the silicone material (2) contains from 0 to 97 mol percent of the siloxane (B), it is preferred that this siloxane be present in an amount from 10 to 90 mol percent. The best results are obtained when the organohydrogensiloxane is present in an amount from 30 to 70 mol percent and the organosiloxane (B) is present in an amount from 30 to 70 mol percent.

These organosiloxanes (B) can range in viscosity from thin fluids of low molecular weight to high molecular weight non-flowing gums. Preferably the viscosity of this siloxane should range from 50 to 20,000 cs. at 25° C.

The silicone-polyethylene coating is best applied to the fibers by first preparing a cationic emulsion of the silicone and polyethylene and then applying the emulsion to the fibers. This cationic emulsion contains from 0.6 to 2.4 percent by weight of an emulsifiable polyethylene and from 0.6 to 2.4 percent of the silicone material (2) and from 95.2 to 98.8 percent water. In order to obtain good results, it is necessary that this emulsion be cationic. The preferred technique for preparing this cationic emulsion comprises preparing a non-ionic silicone (2) emulsion and preparing a cationic emulsion of polyethylene and then adding these emulsions to sufficient water to obtain the desired solids concentration. Alternatively, all of the ingredients can be emulsified together. For the most efficient use of manufacturing facilities, it is preferred that the polyethylene and the silicone materials be emulsified separately and then added to the water. It is preferred that both the polyethylene emulsion and the silicone emulsion be prepared in a concentration of from 20 to 60 percent total solids. These two emulsions can be added to sufficient water so that the concentration of the polyethylene solids is from 0.6 to 2.4 percent by weight (based upon the weight of the total emulsion) and of the organosilicon solids from 0.6 to 2.4 percent by weight.

It is necessary that a cationic emulsifying agent be used to emulsify the polyethylene. Polyethylene with a melting point below 120° C. is preferred because of the difficulty of emulsifying polyethylene which has a higher melting point. It is preferable to use a non-ionic emulsifying agent to emulsify the silicone material. Examples of suitable non-ionic emulsifying agents are the alkyl ethers of polyalkylene glycols, such as polypropylene glycol monobutylether, polyethylene glycol 2-ethylhexylether, and polyethylene glycol monobutyl ether; polyvinyl alcohol; and esters of polyhydric alcohols such as glycerol monostearate, polyoxyethylene distearate and propylene glycol monolaurate. The preferred emulsifying agent is glycerol monostearate.

The amount of emulsifying agent employed for both the polyethylene and silicone emulsion is not critical, but an amount of less than 50 percent by weight based on the weight of the solids present is ordinarily sufficient. Ordinarily, from 1 to 10 percent by weight of an emulsifying agent based upon the weight of the solids is the optimum range.

It is usually desirable to add a condensation catalyst to the treating emulsion in order to cure the siloxanes in the coating composition. Examples of some of the suitable condensation catalysts are the organotitanium compounds and the carboxylic salts of metals above hydrogen in the electromotive series of metals. The organotitanium compounds are those in which the organic groups are linked to the titanium atom through TiOC linkages. The organotitanium compound can be a titanium orthoester in which the organic group is derived from an alcohol, such as tetraisopropyl titanate, or a titanium acylate in which at least some of the organo groups are derived from a carboxylic acid, such as diisopropyldiacetoxy titanate. Organotitanium compounds which are partial condensates of the monomeric titanates can also be used. The organotitanium compound can also be a titanium chelate in which an oxygen or nitrogen atom is chelated with titanium atom such as in triethanolamine titanates and octylene glycol titanates. The preferred catalysts are the triethanolamine titanates and the octylene glycol titanates. Examples of suitable metallic salts of carboxylic acids which can be used are zinc acetate, zirconium acetate, stannous octoate, lead octoate, dibutyltindibenzoate, dibutyltindiacetate and cobalt naphthanate. The preferred catalysts are zinc acetate and zirconium acetate. The best results are obtained by a mixture of zirconium acetate and zinc acetate in a ratio of from 0.1 to 4.5 inclusive zinc atoms per zirconium atom. With this mixture, it is preferred to use sufficient zirconium acetate to provide at least 0.25 percent by weight zirconium calculated as the elemental metal based on the total organopolysiloxanes present, and there is usually no advantage in using more than 30 percent by weight. The best results come from the use of 1 to 7 percent zirconium on this basis. The best results with this combination of salts is obtained when the salts are present in a ratio which provides from 0.5 to 1 zinc atom per zirconium atom. This combination of salts can be incorporated into the treating emulsion by any suitable manner. Since an aqueous solution of the zirconium acetate is commercially available, it is preferred to add the desired amount of zinc acetate to the zirconium acetate solution prior to incorporating the mixture of catalysts into the emulsion, although this technique is not necessarily followed. The zinc acetate and zirconium acetate solution can be incorporated with the polyethylene emulsion or may be added separately. The combination of zinc acetate and zirconium acetate is disclosed in U.S. Patent 2,927,870 (Beutler), which is hereby incorporated by reference.

The treating emulsion can be applied to the glass cloth in any convenient manner such as by spraying, dipping, brushing or flooding. In general, the cloth is usually dipped into the solution until the fibers have become thoroughly wet and is thereafter removed and dried. It is generally desirable to remove excess material from the cloth by using squeeze rollers. The silicone portion of the material can then be cured by heating. In general, the siloxane can be cured by heating for from 1 to 20 minutes at a temperature of from 100 to 200° C.

In general, this treatment causes a pickup of from 0.1 to 2.4 percent by weight of the coating based upon the weight of the cloth. The amount of pickup depends primarily upon the concentration of the treating emulsion. Preferably, the total pickup should range from .5 to 2 percent by weight.

The cationic emulsion of this invention can be used to treat both pigmented and unpigmented glass fibers. The polyethylenesiloxane coating increases both the abrasion resistance and water repellency of the fabric. This coating has a high degree of wash-fastness. This property prevents the removal of the coating and any binder and pigment that might be present. This coating is especially useful on drapes because of their tendency to abrade during handling and laundering. However, this coating can also be used on glass cloth which is used for other purposes. This coating is colorless and consequently does not interfere with either the color imparted by the fibers or any pigment that might be present.

The following examples are illustrative only and should not be construed as limiting the invention which is properly delineated in the appended claims.

The spray ratings set forth in the examples were determined in accordance with the American Association of Textile Chemists and Colorists, Standard Test Method 22–1952 which is fully described in the 1960 "Technical Manual and Yearbook of the American Association of Textile Chemists and Colorists," vol. 36, pp. 158–160. A spray rating of 100 shows that the fabric is completely water repellent. A spray rating of 50 means that the entire surface of the fabric is wet but no water has soaked through. A spray rating of zero means that the water soaks through the fabric. The crock ratings set forth in the examples were determined in accordance with the American Association of Textile Chemists and Colorists, Standard Test Method 8–1957 which is fully described in the 1960 "Technical Manual and Yearbook of the American Association of Textile Chemists and Colorists," vol. 36, page 87. A crock rating of 5 means that there is no color loss and that very little, if any, of the finish is removed during the test. There is progressively more color and finish loss as the crock rating decreases. A crock rating of 1 means that a large amount of color and finish has been lost. This test was performed on both wet and dry samples. The abrasion resistance was determined by continuously flexing the sample until failure. This test was performed with a Stoll Flex Abrader. A one-inch wide strip of fabric was used. Three pounds tension was maintained during flexing on the ⅛" rod around which the fabric was wrapped. The vertical head pressure on the sample was either 1 or 1.5 pounds. The wash-fastness was determined merely by washing the fabric in an automatic washer at 49° C. and observing the amount of pigment lost during washing. A wash-fastness rating of excellent indicates that very little if any pigment was lost during washing.

The following materials were used in the examples.

A. An emulsion containing 18 percent by weight of a trimethylsilyl-endblocked methylhydrogenpolysiloxane, 12 percent by weight of a hydroxyl-endblocked dimethylsiloxane with a viscosity of about 4,000 cs. at 25° C. and 2 percent by weight of a non-ionic glycerol monostearate emulsifying agent.

B. An emulsion containing 18 percent by weight of a trimethylsilyl-endblocked methylhydrogenpolysiloxane, 12 percent by weight of a hydroxyl-endblocked dimethylsiloxane with a viscosity of about 4,000 cs. at 25° C. and 2 percent by weight of an ethoxylated branched alcohol emulsifying agent.

C. An emulsion containing 3 percent by weight of a trimethylsilyl-endblocked methylhydrogensiloxane, 27 percent by weight of a hydroxyl-endblocked dimethylsiloxane with a viscosity of about 4,000 cs. at 25° C. and 2 percent by weight of a non-ionic glycerol monostearate emulsifying agent.

D. An emulsion containing 30 percent by weight of a trimethylsilyl-endblocked methylhydrogensiloxane and 2 percent by weight of a non-ionic glycerol monostearate emulsifying agent.

E. An emulsion containing 18 percent by weight of a trimethylsilyl-endblocked methylhydrogensiloxane, 12 percent by weight of a trimethylsilyl-endblocked phenylmethylsiloxane fluid and 2 percent by weight of a non-ionic glycerol monostearate emulsifying agent.

F. An emulsion containing 18 percent by weight of a trimethylsilyl-endblocked methylhydrogensiloxane, 12 percent by weight of a copolymer composed of 20 mol percent of

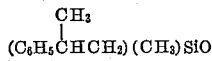

units and 80 mol percent $CH_3(C_2H_5)SiO$ units and 2 percent by weight of a non-ionic glycerol monostearate emulsifying agent.

G. An emulsion containing 35 percent by weight of a coplymeric siloxane composed of 20 mol percent

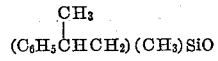

units and 80 mol percent $CH_3(C_2H_5)SiO$ units and 2 percent by weight of a non-ionic glycerol monostearate emulsifying agent.

H. An emulsion containing 30 percent by weight of a

J. An emulsion containing 18 percent by weight of a trimethylsilyl-endblocked methylhydrogensiloxane, 12 percent by weight of a trimethylsilyl-endblocked 3,3,3-trifluoropropylmethylsiloxane fluid and 2 percent by weight of a non-ionic glycerol monostearate emulsifying agent.

K. An emulsion containing 3 percent by weight of a trimethylsilyl-endblocked methylhydrogensiloxane, 27 percent by weight of a trimethylsilyl-endblocked fluid copolymer of dimethylsiloxane, phenylmethylsiloxane and dichlorophenylsiloxane and 2 percent by weight of a non-ionic glycerol monostearate emulsifying agent.

L. An emulsion of 7.5 percent by weight of a trimethylsilyl-endblocked methylhydrogensiloxane and 22.5 percent by weight of a dimethylsiloxane.

M. A non-silicone commercial finish for glass cloth.

N. A cationic emulsion containing 30 percent by weight polyethylene.

O. A non-ionic emulsion containing 30 percent by weight polyethylene.

P. A solution containing 5 parts by weight zirconium acetate and 1 part by weight of zinc acetate.

Q. An emulsion containing 30 percent by weight of a trimethylsilyl-endblocked phenylmethylsiloxane fluid and 2 percent by weight of a non-ionic glycerol monostearate emulsifying agent.

*Example 1*

The improved abrasion resistance (flex life) obtained by silicone-polyethylene finish for glass fabric over a silicone finish is demonstrated in this example. This example also demonstrates that a variety of silicones can be used in conjunction with the polyethylene. A brown pigmented glass cloth was treated with the following silicone-polyethylene finishes. The glass cloth was dipped into the treating bath and then run through squeeze rollers. The treated glass cloth was then air dried and cured for 1½ min. at 177° C. After curing, the sample was tested for spray rating, flex life, crock and washfastness in accordance with the procedure set forth above. The vertical head pressure on the Stoll Flex Abrader was one pound. The treating compositions used and the results obtained are set forth in Table I. The percentages in Table I are based upon the total weight of the treating bath. The treating bath was prepared by adding the emulsions to sufficient water to obtain the desired concentration.

TABLE I

| | Composition of treating bath | | | Results | | | | |
|---|---|---|---|---|---|---|---|---|
| | Percent of polyethylene emulsion | Percent silicone emulsion | Percent catalyst | Spray rating | Flex life | Crock | | Wash fastness |
| | | | | | | Dry | Wet | |
| 1 | | 4% A | .4% P | 100 | 168 | 5 | 2 | Good. |
| 2 | 4% N | 4% A | .4% P | 90-100 | 1245 | 4 | 5 | Do. |
| 3 | 4% N | 4% F | .4% P | 90 | 1906 | 4 | 4 | Poor. |
| 4 | 4% N | 4% E | .4% P | 80-90 | 2007 | 5 | 5 | Good. |
| 5 | 4% N | 4% C | .4% P | 90-100 | 2121 | 5 | 5 | Do. |
| 6 | 4% N | 4% D | .4% P | 90-100 | 1793 | 3 | 5 | Do. |
| 7 | 4% N | 4% I | .4% P | 90-100 | 1697 | 5 | 5 | Do. |
| 8 | 4% N | 4% J | .4% P | 90 | 1276 | 3 | 5 | Do. | copolymeric siloxane composed of 20 mol percent

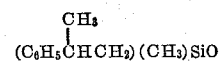

units and 80 mol percent $CH_3(C_2H_5)SiO$ units and 2 percent by weight of a non-ionic glycerol monstearate emulsifying agent.

I. An emulsion containing 18 percent by weight of a trimethylsilyl-endblocked methylhydrogensiloxane and 12 percent by weight of trimethylsilyl-endblocked ethylmethylsiloxane fluid and 2 percent by weight of a non-ionic glycerol monostearate emulsifying agent.

*Example 2*

This example demonstrates the necessity for using a cationic polyethylene emulsion rather than a non-ionic emulsion. This example also demonstrates the results obtained by varying the amount of polyethylene in the treating bath. The treating bath was prepared and the glass fiber treated and cured in the same manner as in Example 1. The glass fiber was tested in accordance with the procedure set forth above. The vertical head pressure on the Stoll Flex Abrader was 1.5 lbs. The glass cloth in this example was a Slater's brown pigmented glass cloth.

TABLE II

| | Composition of treating bath | | | Results | | | | |
|---|---|---|---|---|---|---|---|---|
| | Percent of polyethylene emulsion | Percent silicone emulsion | Percent catalyst | Spray rating | Flex life | Crock | | Wash fastness |
| | | | | | | Dry | Wet | |
| 1 | 1% N | 4% A | .4% P | 90–100 | 222 | 4 | 3 | Good. |
| 2 | 2% N | 4% A | .4% P | 90–100 | 485 | 4 | 4 | Do. |
| 3 | 3% N | 4% A | .4% P | 90–100 | 715 | 4 | 4 | Do. |
| 4 | 4% N | 4% A | .4% P | 90–100 | 995 | 4 | 4 | Do. |
| 5 | 5% N | 4% A | .4% P | 90–100 | 895 | 4 | 4 | Do. |
| 6 | 4% O | 4% A | .4% P | 0 | 527 | 4 | 2 | Poor. |
| 7 | | 4% A | .4% P | 90–100 | 175 | 4 | 4 | Good. |
| 8 | 3.63% N | 4% A | .36% P | 90–100 | 1,165 | 4 | 4 | Excellent. |
| 9 | 3.63% N | 3% A | .36% P | 90–100 | 973 | 3 | 3 | Do. |
| 10 | 4.09% N | 3% A | .41% P | 90–100 | 969 | 3 | 3 | Do. |
| 11 | 2.73% N | 3% A | .27% P | 90–100 | 1,001 | 3 | 3 | Do. |
| 12 | 3% M | | | 90–100 | 249 | 2 | 3 | Do. |
| 13 | 3.63% N | 4% B | .36% P | 90 | 1,212 | | | |
| 14 | 3.63% N | 2.25% G and 1.75% D. | .36% P | 80 | 888 | | | |
| 15 | 3.63% N | 3.54% H and .46% D. | .36% P | 90 | 690 | | | |
| 16 | 3.63% N | 3.54% Q and .46% D. | .36% P | 80 | 899 | | | |
| 17 | 3.63% N | 4% K | .36% P | 80 | 652 | 3 | 2 | |
| 18 | 3.63% N | 4% I | .36% P | 80 | 752 | 4 | 2 | |
| 19 | 3.63% N | 4% L | .36% P | 90–95 | 615 | 4 | 5 | |

Example 3

This example demonstrates the use of the silicone polyethylene finishing composition on glass fibers that contain a binder. A treating bath was prepared which contained 4 percent by weight (A), 3.63 percent by weight (N) and .36 percent by weight (P). The treating bath was prepared merely by adding the emulsions and solutions to a sufficient quantity of water to obtain the desired concentration. The glass fabric was dipped in the treating bath and cured in the same manner as in Example 1 and tested in accordance with the previously described procedure. A decorative unpigmented glass fabric was treated with an emulsion containing 5 percent by weight ethyl acrylate binder and then treated with the finishing composition described above. This glass fabric had a flex life of 710. An unpigmented decorative glass fabric was treated with an emulsion containing 5 percent ethyl acrylate binder, 2 percent polytetrafluoroethylene and 2.25 percent of a silica dispersion diluent. The fabric was then treated with the above finishing composition. This fabric had a flex life of 1440. The vertical head pressure on the Stoll Flex Abrader was 1.5 lbs.

Example 4

Excellent results are obtained when any of the following silicone emulsions are substituted for the silicone emulsion used in No. 2 of Table I and the procedure of Example 1 is followed:

A. 4 percent by weight of an emulsion containing 18 percent by weight of an amylhydrogensiloxane, 12 percent by weight of a hydroxyl-endblocked dimethylsiloxane with a viscosity of about 4,000 cs. at 25° C. and 2 percent by weight of a non-ionic glycerol monostearate emulsifying agent.

B. 1.2 percent by weight of an emulsion containing 18 percent by weight of a trimethylsilyl-endblocked methylhydrogensiloxane, 12 percent by weight of a hydroxyl-endblocked dimethylsiloxane with a viscosity of about 4,000 cs. at 25° C. and 2 percent by weight of a non-ionic glycerol monostearate emulsifying agent.

C. 4 percent by weight of an emulsion containing 1.5 percent by weight of a trimethylsilyl-endblocked methylhydrogensiloxane, 98.5 percent by weight of a hydroxyl-endblocked dimethylsiloxane with a viscosity of about 4,000 cs. at 25° C. and 2 percent of a non-ionic glycerol monostearate emulsifying agent.

D. 4 percent by weight of an emulsion containing 18 percent by weight of a trimethylsilyl-endblocked methylhydrogensiloxane, 12 percent by weight of a hydroxyl-endblocked octadecylmethylsiloxane with a viscosity of about 4,000 cs. at 25° C. and 2 percent of a non-ionic glycerol monostearate emulsifying agent.

E. 4 percent by weight of an emulsion containing 18 percent by weight of a trimethylsilyl-endblocked methylhydrogensiloxane, 12 percent by weight of a hydroxyl-endblocked cyclohexylmethylsiloxane with a viscosity of about 4,000 cs. at 25° C. and 2 percent of a non-ionic glycerol monostearate emulsifying agent.

Excellent results are obtained when any of the following catalysts are substituted for the catalyst used in No. 2 in Table I and the procedure of Example 1 is followed.

A. .3 percent by weight of octyleneglycol titanate
B. .3 percent by weight of triethanolamine titanate.
C. .3 percent by weight stannous octoate.
D. .15 percent by weight dibutyltindiacetate.
E. .2 percent by weight dibutyltindibenzoate.

That which is claimed is:

1. An article of manufacture comprising a woven glass cloth, the fibers in said cloth being coated with from 0.1 to 2.4 percent by weight based upon the weight of the glass cloth of a composition consisting essentially of
   (1) 100 parts by weight of polyethylene and
   (2) from 25 to 400 parts by weight of
      (A) from 3 to 100 mol percent of a siloxane of the unit formula $R_aH_bSiO_{4-a-b/2}$, wherein R is an alkyl radical of from 1 to 5 inclusive carbon atoms, $a$ has a value of from 1.0 to 1.5 inclusive, $b$ has a value of from 0.75 to 1.25 inclusive, and the sum of $a$ and $b$ is from 2.0 to 2.25 inclusive,
      (B) from 0 to 97 mol percent of a siloxane of the unit formula $R'_nSiO_{4-n/2}$, wherein R' is selected from the group consisting of monovalent hydrocarbon radicals of from 1 to 18 inclusive carbon atoms, dichlorophenyl, and perfluoroalkylethyl radicals of the general formula $C_yF_{2y+1}CH_2CH_2$— wherein $y$ has a value of from 1 to 10 inclusive and $n$ has a value of from 1.75 to 2.2 inclusive.

2. An article of manufacture comprising a woven glass cloth, the fibers in said cloth being coated with from 0.1 to 2.4 percent by weight based on the weight of the glass cloth of a composition consisting essentially of
   (1) 100 parts by weight of polyethylene and
   (2) from 60 to 150 parts by weight of
      (A) from 10 to 90 mol percent of methylhydrogensiloxane and
      (B) from 10 to 90 mol percent of a siloxane of the unit formula $R'_nSiO_{4-n/2}$, wherein R' is an alkyl radical of from 1 to 6 inclusive carbon atoms and $n$ has a value of from 1.9 to 2.1 inclusive.

3. The article of manufacture of claim 2 wherein R′ is methyl.

4. A cationic emulsion for coating glass fibers consisting essentially of
(1) from 0.6 to 2.4 percent by weight of an emulsifiable polyethylene,
(2) from 0.6 to 2.4 percent by weight of
  (A) from 3 to 100 mol percent of a siloxane of the unit formula $R_aH_bSiO_{4-a-b/2}$, wherein R is an alkyl radical of from 1 to 5 inclusive carbon atoms, $a$ has a value of from 1.0 to 1.5 inclusive, $b$ has a value of from 0.75 to 1.25 inclusive and the sum of $a$ and $b$ is from 2.0 to 2.25 inclusive,
  (B) from 0 to 97 mol percent of a siloxane of the unit formula $R'_nSiO_{4-n/2}$, wherein R′ is selected from the group consisting of monovalent hydrocarbon radicals of from 1 to 18 inclusive carbon atoms, dichlorophenyl and perfluoroalkylethyl radicals of the general formula $C_yF_{2y+1}CH_2CH_2-$ wherein $y$ has a value of from 1 to 10 inclusive and $n$ has a value of from 1.75 to 2.2 inclusive, and
(3) from 95.2 to 98.8 percent by weight water.

5. A cationic emulsion for coating glass fibers consisting essentially of
(1) from 0.6 to 2.4 percent by weight of an emulsifiable polyethylene,
(2) from 0.6 to 2.4 percent by weight of
  (A) from 10 to 90 mol percent of a methylhydrogensiloxane and
  (B) from 10 to 90 mol percent of a siloxane of the unit formula $R'_nSiO_{4-n/2}$, wherein R′ is an alkyl radical of from 1 to 6 inclusive carbon atoms and $n$ has a value of from 1.9 to 2.1 inclusive and
(3) from 95.2 to 98.8 percent by weight water and a condensation catalyst.

6. The cationic emulsion of claim 5 wherein R′ is methyl and the condensation catalyst is the carboxylic salt of metals above hydrogen in the electromotive series of metals.

7. The cationic emulsion of claim 6 wherein the carboxylic salt is a mixture of zirconium acetate and zinc acetate in a ratio of from 0.1 to 4.5 inclusive zinc atoms per zirconium atom.

References Cited

UNITED STATES PATENTS

| | | | |
|---|---|---|---|
| 2,688,007 | 8/1954 | Steinman | 260—29.6 |
| 2,739,058 | 3/1956 | O'Flynn et al. | 260—29.6 |
| 2,888,419 | 5/1959 | Safford | 260—41 |
| 2,888,424 | 5/1959 | Precopio et al. | 260—41 |
| 2,927,870 | 3/1960 | Bentler | 260—29.2 |
| 2,995,533 | 8/1966 | Parmer et al. | 260—29.6 |

SAMUEL H. BLECH, *Primary Examiner.*

L. BERCOVITZ, M. TILLMAN, *Examiners.*

J. NORRIS, J. WHITE, *Assistant Examiners.*